(No Model.) 2 Sheets—Sheet 1.
A. H. KOEHLER.
WHISTLING BICYCLE HANDLE BAR.
No. 573,666. Patented Dec. 22, 1896.
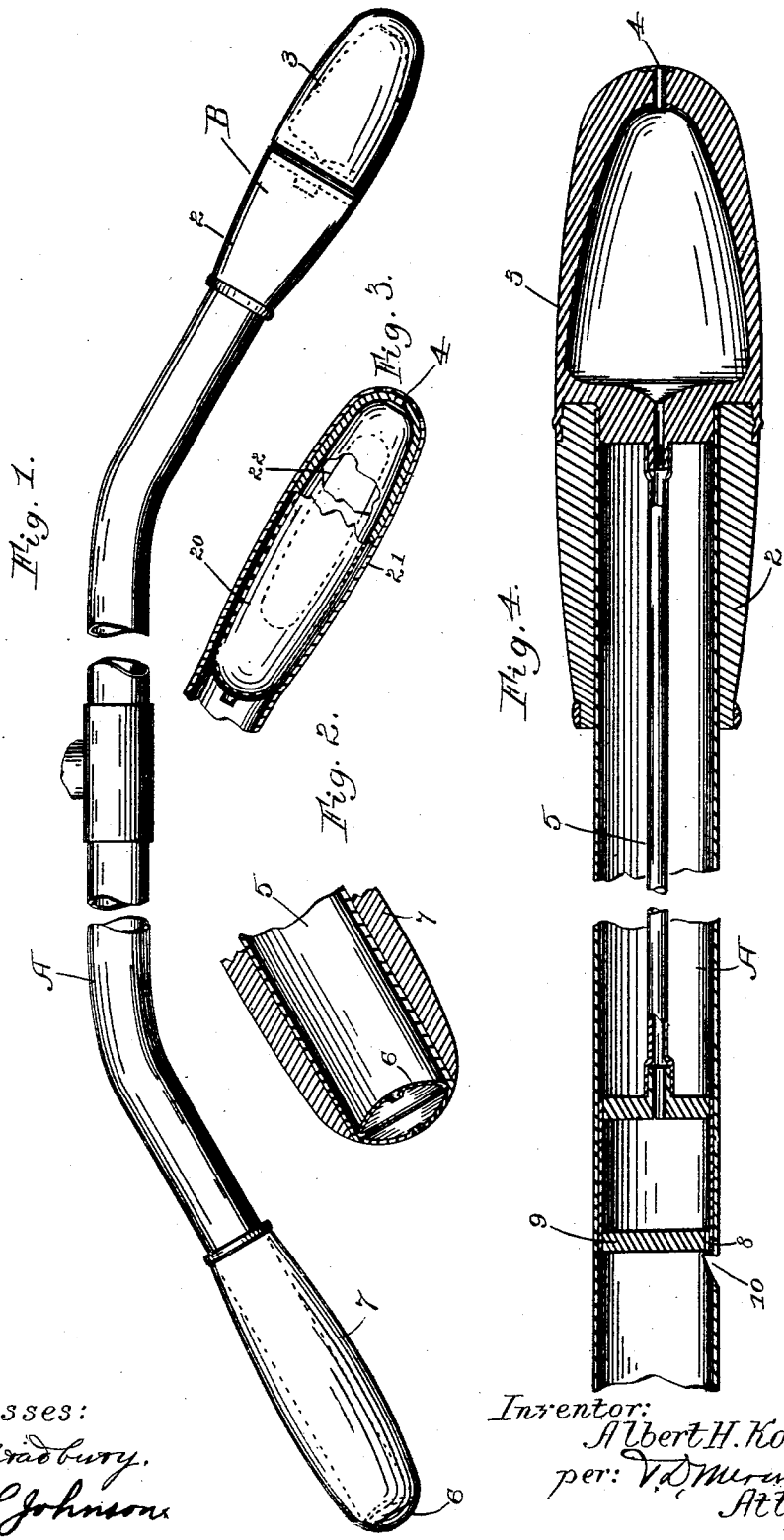
Witnesses:
H. T. Bradbury.
H. S. Johnson.
Inventor:
Albert H. Koehler.
per: V. D. Mirum
Attorney.

(No Model.) 2 Sheets—Sheet 2.
A. H. KOEHLER.
WHISTLING BICYCLE HANDLE BAR.
No. 573,666. Patented Dec. 22, 1896.
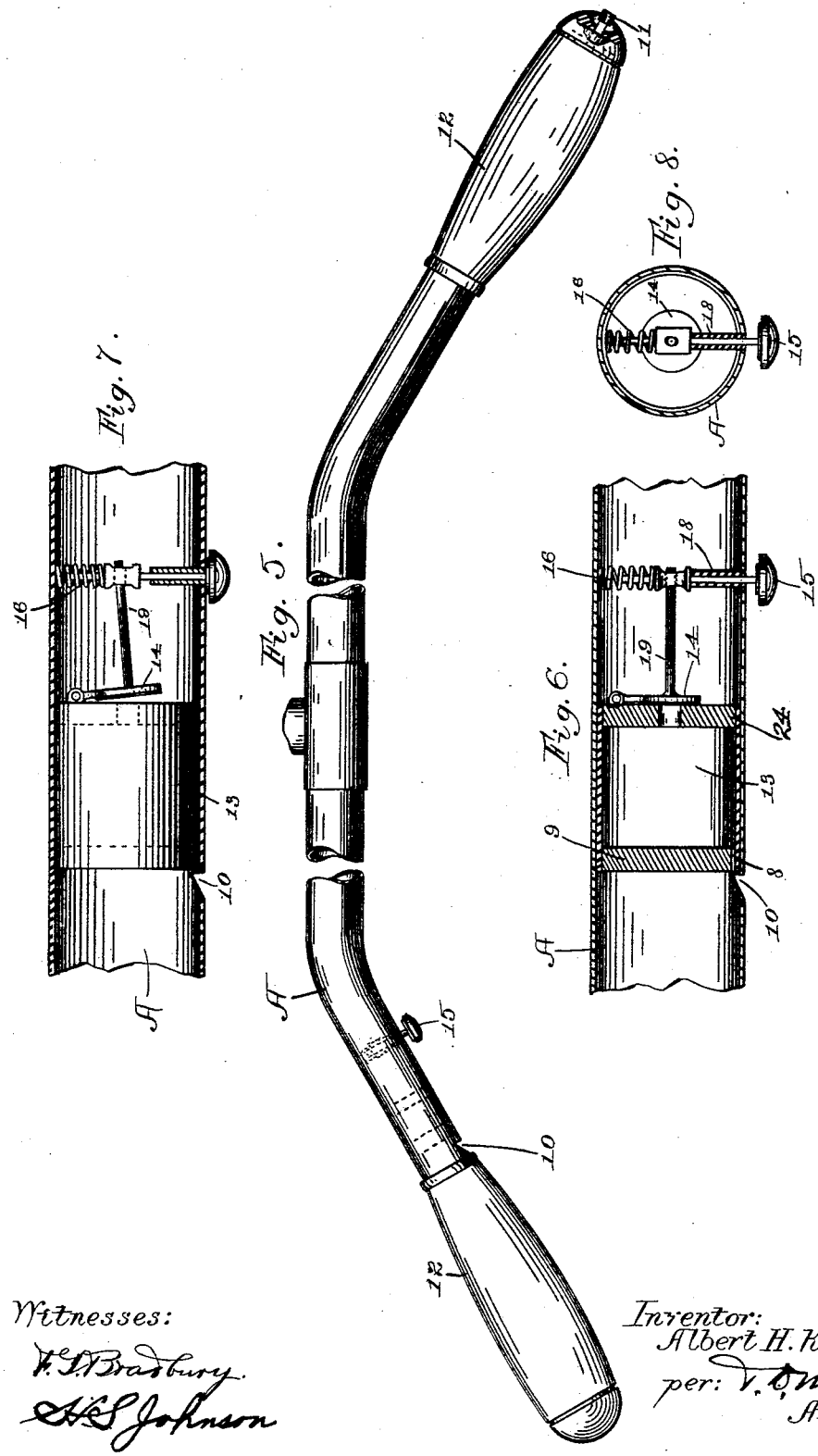
Witnesses:
F. T. Bradbury.
H. S. Johnson
Inventor:
Albert H. Koehler,
per: V. O. Merwin
Attorney.

UNITED STATES PATENT OFFICE.

ALBERT H. KOEHLER, OF ST. PAUL, MINNESOTA.

WHISTLING BICYCLE HANDLE-BAR.

SPECIFICATION forming part of Letters Patent No. 573,666, dated December 22, 1896.

Application filed August 29, 1895. Serial No. 560,851. (No model.)

*To all whom it may concern:*

Be it known that I, ALBERT H. KOEHLER, of St. Paul, Ramsey county, Minnesota, have invented certain Improvements in Whistling Bicycle Handle-Bars, of which the following is a specification.

My invention relates to improvements in signaling devices for bicycles, its object being to provide such a device as part of the handle-bar, so as not to add materially to the weight or cost of the bicycle or mar its appearance, and at the same time furnish an efficient and easily-operated signal.

To this end my invention consists in providing the hollow handle-bar with a whistling vent or orifice, and so constructing said bar that it may serve as a reservoir or chamber for compressed air, which is released at will by the operation of a valve, so as to blow the whistle, or by providing the bar with an included or attached elastic pneumatic bulb or elastic compressible chamber which is normally distended and filled with air, and which can be compressed by the hand of the rider, so as to expel the contained air and sound the whistle.

My invention further consists in the features of construction hereinafter more particularly described and claimed.

In the accompanying drawings, forming part of this specification, Figure 1 is a plan view of the bicycle handle-bar having one of its handles formed in part with a rubber bulb connected by means of the handle-bar tube to the whistle in the end of the other handle. Fig. 2 is a detail of the whistle shown in Fig. 1. Fig. 3 is an enlarged detail of a modified form of handle provided with an elastic compartment or bulb. Fig. 4 is an enlarged sectional detail of the form of handle shown in Fig. 1 with a connected tube leading to a modified form of whistle. Fig. 5 is a plan view of a bicycle handle-bar constructed to serve as a pneumatic reservoir, and Figs. 6, 7, and 8 are sectional details of the valve for releasing the contained air to sound the whistle.

In the drawings, A represents a handle-bar of ordinary tubular structure, to one end of which is attached the handle B, made up of the handpiece 2 of ordinary character, having the rubber-bulb extension part 3, provided with an inlet-valve 4. This bulb is connected by means of the handle-bar tube with the whistle.

In the preferred construction (shown in Figs. 1 and 2) the whistle 6, formed of two cup-shaped disks, is fixed in the end of the handle 7, and the handle-bar tube connects directly with it, so that the compressing of the bulb 3 will sound the whistle, and when the bulb is released it is immediately filled and ready for further use.

In the preferred construction of combined handle and bulb (shown in Fig. 3) the bulb 20 is arranged inside the hollow handle 21, provided with a slot 22, through which the finger-tips may enter to compress the bulb.

In the modified construction of whistle (shown in Fig. 4) the conduit 5 leads to a circumferential segmental opening 8 in the partition 9, which opens to the notch 10 in the side wall of the bar, constituting the whistle.

In the other modification (shown in Figs. 5, 6, 7, and 8) the bar constitutes a pneumatic reservoir having an inlet-valve 11 at the end of one of the handles 12. In this construction the bar is shown with a notch 10, constituting a lateral whistle of the same character as that shown in Fig. 4, and air is admitted from the handle-reservoir to the whistle by means of the opening 13 in the partition 24, whence it passes to the segmental opening 8 in the partition 9, the opening 13 being normally closed by the hinged valve 14. This valve is opened by a push-button 15, having a restraining-spring 16, and sliding in the interior radial hollow stud 18 and attached to the valve-stem 19. In Fig. 6 the valve is shown in normal or closed position, and in Fig. 7 in open position.

In use the form shown in Figs. 1 and 4 is operated normally by slipping the hand from the end piece 2 to the extension part 3 and compressing the same with the fingers, so as to expel the air and force it through the whistle. In the preferred construction (shown in Fig. 3) the bulb is compressed simply by pressing the finger-tips through the slot in the handle. In the construction shown in Figs. 4, 5, 6, and 7 the handle is charged with compressed air through its valve 11 by means of the regular bicycle air-pump, and the air is freed from the reservoir, so as to sound the connected whistle by pressing the button 15.

It is evident that other modifications of my invention may be made in non-essential details without departing from the idea of my invention.

I claim—

1. As an improved article of manufacture a bicycle handle-bar formed with a whistling-orifice through its wall, an included air-chamber communicating with said orifice, and an inlet-valve through the wall of the handle-bar for admitting air to said included chamber.

2. In a bicycle, the tubular handle-bar therefor formed with a whistling-vent, the included reservoir, and means for causing the air to pass from said reservoir through said vent to sound a whistle.

3. In combination with a hollow bicycle handle-bar and its handles, a whistle connected with the interior of said bar, and the elastic pneumatic reservoir included in one of said handles.

4. As an improved article of manufacture, the hollow handle-bar having a whistling-vent, and the included pneumatic bulb communicating with said whistling-vent.

5. As an improved article of manufacture, the hollow bicycle handle-bar having one of its handles fitted with a whistle, and the other provided with a compressible elastic pneumatic compartment communicating with said whistle.

6. As an improved article of manufacture, the hollow bicycle handle-bar having a whistle in the end of one handle, the other handle formed hollow with a slotted opening, and the rubber bulb included in said hollow handle, and communicating with said whistle and having a suitable valve-inlet.

In testimony whereof I affix my signature in presence of two witnesses.

ALBERT H. KOEHLER.

Witnesses:
H. S. JOHNSON,
MINNIE L. THAUWALD.